US005479777A

United States Patent [19]

Mickel et al.

[11] Patent Number: 5,479,777

[45] Date of Patent: Jan. 2, 1996

[54] TORQUE AND SPEED CONTROL METHODS AND APPARATUS FOR PNEUMATIC MOTORS

[75] Inventors: Thomas J. Mickel, Jupiter; Stewart W. Willason, Palm Beach Gardens, both of Fla.

[73] Assignee: Mednext Inc., Riviera Beach, Fla.

[21] Appl. No.: 227,856

[22] Filed: Apr. 15, 1994

[51] Int. Cl.[6] .............................. F16D 31/00; F16D 31/02

[52] U.S. Cl. .............................. 60/327; 60/409; 60/413; 91/4 R

[58] Field of Search .............................. 60/370, 407, 408, 60/409, 410, 411, 413, 415, 417, 418, 419, 327; 91/4 R; 138/30, 31

[56] References Cited

U.S. PATENT DOCUMENTS

| | | | |
|---|---|---|---|
| 3,348,378 | 10/1967 | Lemley | 60/409 |
| 3,693,351 | 9/1972 | Minkus | 60/370 X |
| 3,748,858 | 7/1973 | Venus | 60/415 X |
| 3,880,250 | 4/1975 | Emanuele | 60/415 X |
| 4,481,768 | 11/1984 | Goshorn et al. | 60/415 X |
| 4,630,442 | 12/1986 | Massaro et al. | 60/415 |
| 5,131,226 | 7/1992 | Hendry | 91/4 R X |
| 5,165,232 | 11/1992 | Amelio et al. | 60/408 X |

OTHER PUBLICATIONS

J. D. Clemis, N. J. Markus, "Otosurgical Application of the Midas Rex Pneumatic Tool," ORL, vol. 84, Nov.–Dec. 1977, pp. 980–981.

Operating and Maintenance Specialties, Inc. brochure describing Ray Snubber™. 1991.

*Primary Examiner*—Edward K. Look
*Assistant Examiner*—Hoang Nguyen
*Attorney, Agent, or Firm*—Akin, Gump, Strauss, Hauer & Feld

[57] ABSTRACT

Apparatus and methods to facilitate alteration of the torque and speed characteristics of a pneumatic motor to reduce start-up reaction torque and minimize run-on time after disconnection of the motor from a source of pressurized gas. A series connected accumulator and proportional gas flow/control/dump valve are inserted between a pressurized gas supply and a pneumatic motor, after which the accumulator volume is optimized by an iterative method to satisfactorily reduce transient motor start-up reaction torque while maintaining motor run-on time within an acceptable range.

4 Claims, 4 Drawing Sheets

TORQUE AND SPEED CONTROL METHODS AND APPARATUS FOR PNEUMATIC MOTORS

FIELD OF THE INVENTION

The invention relates to methods and apparatus for modifying the torque and speed characteristics of gas-powered (i.e., pneumatic) motors.

PRECISION DRILLING AND FINISHING OPERATIONS

Drilling, grinding, polishing and related material-removal operations with gas-powered motors are part of many industrial and surgical procedures. During motor start-up, interactions among the inertial effects of the motor moving parts, the dynamic response of the gas supply system and the motor support means can result in relatively high transient torque values being applied to any tool coupled to the motor. Simultaneously, correspondingly high reaction torques may be applied to the motor frame and frame supports or to a human operator holding the motor. High torques applied to tools may result in tool breakage, excessive wear rates, and undesirable temperature rises in the tool or workpiece. Unnecessarily high reaction torques, on the other hand, may result in distortion or breakage of motor support means, or undesired movement and operator stress in the case of hand-held motors.

While the above discussion applies to motor start-up torques, the manner in which motor speed is reduced to zero after the pressurized gas supply is shut off may also adversely affect the accuracy of finishing operations and the level of operator stress (for hand-held tools). For example, rapid reductions in motor speed and the resultant undesirably high reaction torques may cause operator fatigue and tool positioning errors. Conversely, significant motor run-on times (i.e., continued motor shaft rotation after cut-off of the pressurized gas supply) may result in excessive material removal and/or loss of time before the tool can be repositioned for continued material removal operations.

GAS-DRIVEN MOTORS IN ORTHOPEDIC SURGERY

The reduced accuracy of tool control which can result from excessively high reaction torques is particularly deleterious in pneumatic motors used for shaping of bone or prostheses. Very precise manual control of motor and tool placement is required during surgical operations to avoid medical complications. Hence, motors used in surgery should exhibit smooth and relatively rapid attainment of operating speed, as well as controlled and rapid speed reduction after gas supply shut-off. The relatively low reaction torques thus produced would allow the surgeon to better maintain the highly accurate tool control needed to prevent damage to delicate anatomic structures near the moving tool. Ideally, neither motor speed-up nor shut-down would be associated with excessively high reaction torques, but both speed transitions would be accomplished in optimally short times to decrease stress on the surgeon and keep the overall operation time as short as possible. Presently available pneumatic motors and control systems, however, are less than ideal.

In particular, commercial pneumatic motor control units generally direct a gas stream to a motor at the full source pressure through a relatively low-compliance, high-pressure hose and valve assembly. The result is often high-torque motor starts which tend to twist the motor in the user's hands, combined with excessive motor run-on after shut-off of the pressurized gas supply valve due to gas pressure in the pneumatic lines bleeding down through the motor.

SUMMARY OF THE INVENTION

The present invention overcomes excessive reaction torques and undesirable motor run-on in pneumatic motors by providing apparatus capable of altering both the torque and speed characteristics (including motor run-on time) of any such motor when the apparatus is inserted (connected in series) between the motor and a pressurized gas supply. Elements of the apparatus include a proportional gas control valve which itself preferably comprises a coupled gas depressurization (dump) valve, the dump valve communicating in turn with a pneumatic accumulator. The proportional gas control valve has a pressurized gas inlet for communication with the pressurized gas supply and a proportionally controlled gas outlet, and is preferably connected in series between the pressurized gas supply and the accumulator. The accumulator has an accumulator gas inlet for communication with the proportionally controlled gas outlet of the gas control valve, and an accumulator gas outlet for communicating with the pneumatic motor.

Other features of the invention include the preferred use of non-twist pressure hose (which will not significantly change its longitudinal twist under changing internal pressure) to connect the accumulator gas outlet to the motor. The accumulator in certain embodiments has an optionally adjustable compressible gas volume and, also optionally, one or more internal baffles. The dump valve, which comprises an exhaust port, optionally includes an exhaust port muffler having an adjustable gas flow resistance. The invention also includes methods for optimally sizing and/or adjusting the apparatus in each pneumatic motor application.

Due to the interaction of the compressible gas volume within the pneumatic accumulator with the compressible gas volume distributed throughout the pressure hose, as well as the flow resistance inherent in a length of pressure hose, preferred volumes for both the accumulator and hose are preferably determined empirically, being sequentially and iteratively readjusted for each combination of motor, hose and accumulator. Depending on the motor gas consumption rate and the desired motor torque and speed characteristics, either the hose volume or the accumulator volume or both be altered as described herein to achieve the desired characteristics while maintaining acceptably short motor run-on times.

Torque and speed characteristics may be represented graphically or mathematically specified as local torque or speed maxima on plots of the relevant variable with respect to time. Additionally, motor speed rise time (i.e., the time required for motor shaft speed to increase from zero to ninety percent of its steady-state value) may be specified. Motor run-on time is that time that the motor shaft continues to turn after the gas control valve has shut off the pressurized gas supply to the motor (i.e., the time it takes the motor speed to decay from its rated steady-state speed to zero after gas supply shut-off).

Note that the presence of an accumulator in the above apparatus may have different effects on system gas dynamics in any system in which the apparatus is inserted, depending on its compressible gas volume, flow resistance, and position within the total length of pressure hose which connects a gas supply to a pneumatic motor. Indeed, even the gas dynamics of the gas supply itself may affect the optimal value of accumulator compressible gas volume chosen for a particular configuration.

To improve gas dynamics which are not satisfactorily compensated with an accumulator having a fixed compressible gas volume during motor operation (including accumulators having a manually adjustable compressible gas volume), the present invention includes accumulators having one or more internal baffles, which may be configured to augment the effect of the compressible gas volume within the accumulator in reducing transmission of gas pressure transients through the accumulator. Other preferred embodiments of the accumulator may include a passive, time-varying internal volume adjustment capability (e.g., a piston-spring-damper subassembly communicating with the compressible gas volume within the accumulator). For more complex system dynamics and/or more rigorous control criteria, an active, mechanical, electrical or pneumatic driver may be added to or substituted for the above piston-spring-damper subassembly, the driver being coupled to a control system having as its input(s) motor speed and/or motor torque.

DETAILED DESCRIPTION

Figure 1:
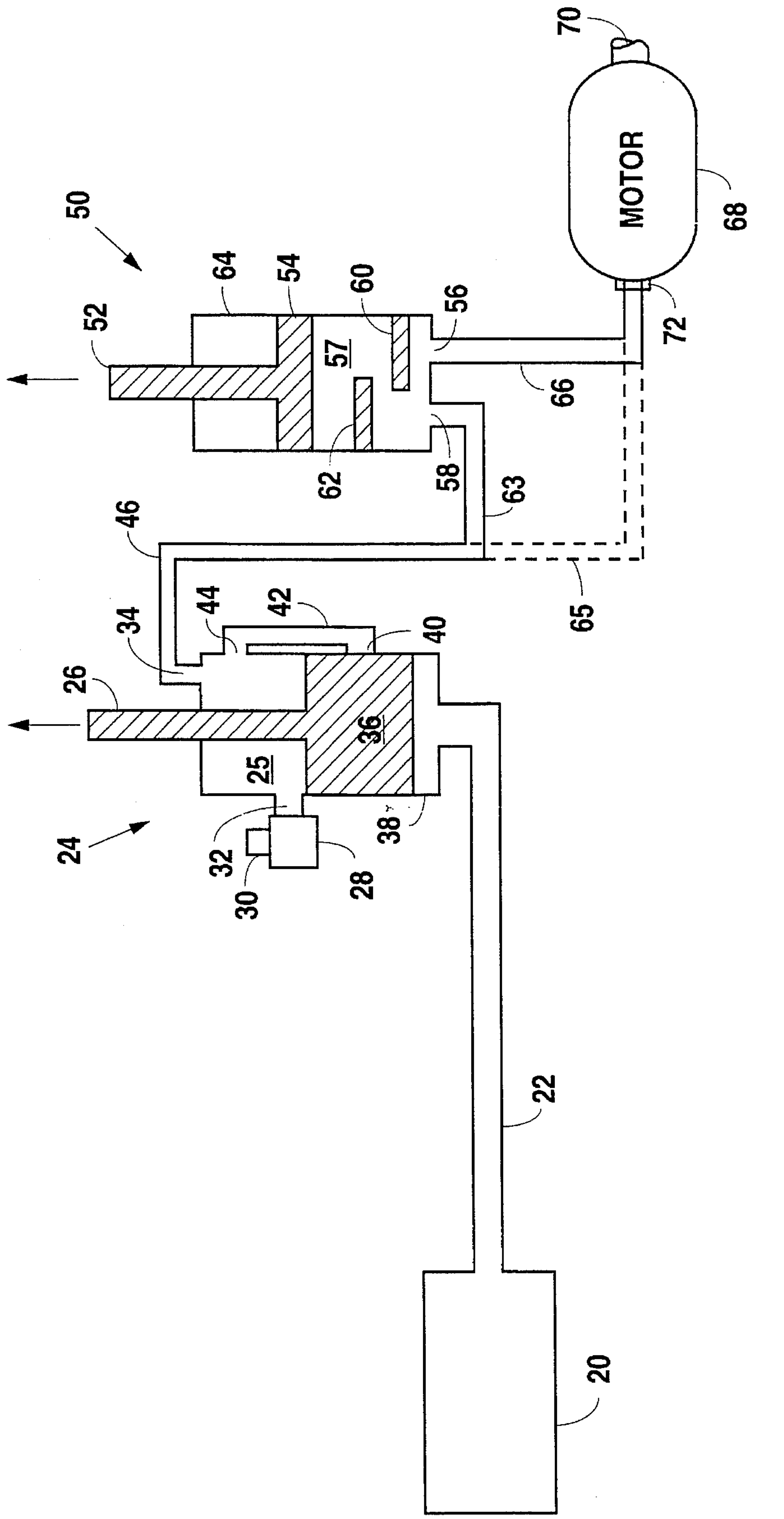
FIG. 1 schematically illustrates a preferred embodiment of a pneumatic accumulator (in partial cross-section) connected in series with a gas supply, a motor, and a combination proportional control and dump valve (in partial cross-section).

Referring to FIG. 1, a series-connected accumulator 50 as in the present invention has a function analogous to that of a low-pass filter in an electrical circuit. That is, as a low-pass filter tends to block relatively high frequency components of electrical waveforms, the accumulator 50 in an analogous way tends attenuate or substantially eliminate relatively sharply rising gas pressure fronts (i.e., the gas pressure waveforms having relatively high frequency components) within the pressure hoses 46, 63. This filtering function becomes more pronounced with increases in the compressible gas volume 57 of accumulator 50, but a relatively large compressible gas volume 57 also tends to result in a relatively slow rate of rise of gas pressure in pressure hose 66, and therefore a relatively slow rise time for rotational speed of motor shaft 70 as driven by motor 68.

Additionally, relatively large compressible gas volumes 57 in accumulator 50 tend to create undesirable noise when the pressurized gas within is dumped to the ambient atmosphere through dump valve exhaust port 32 (to reduce motor run-on time). Hence, determining optimal compressible gas volume 57 for ;accumulator 50 for a given application rests on balancing the need for effective reduction of motor torque transients due to gas pressure transients (i.e., the need for larger compressible gas volume 57) with the need for relatively short motor speed rise times for operational efficiency (i.e., the need for smaller compressible gas volume 57).

Besides tending to shorten motor speed rise times, a relatively small compressible gas volume 57 in accumulator 50 also tends to shorten run-on times for motor 68 by minimizing the compressible gas volumes 57 which must pass through motor 68 or be dumped (through dump valve exhaust port 32) to the ambient atmosphere. Note that decreasing the compressible gas volume 57 of accumulator 50 excessively in an attempt to reduce run-on time of motor 68 will also tend to increase the likelihood of higher torque transients being produced by motor 68. Thus, one might consider obtaining an analogous effect for at least a portion of any desired reduction in compressible gas volume 57 by reducing the volume of pressure hoses 46, 63, 66, especially that of pressure hose 66 which is serially connected between accumulator 50 and motor 68.

However, for a given length of pressure hose 66, the internal hose volume can be reduced only by a reduction of internal hose diameter. Such hose diameter reductions act both to increase the flow resistance of pressure hose 66 (flow resistance being substantially inversely proportional to the fourth power of the internal radius of pressure hose 66), and also to increase the velocity of gas moving within pressure hose 66. But increases in fixed flow resistance within pressure hose 66 and relatively high-velocity gas flow within pressure hose 66 are both generally undesirable.

Increases in fixed flow resistance in pressure hose 66, for example, tend to limit the gas flow adjustments which can otherwise be effected by the introduction of a predetermined (interchangeable and optional) series flow resistor 72 within or adjacent to motor 68. Additionally, high-velocity gas flow tends to lengthen run-on times for motor 68 because of the increase in kinetic energy of a quantity of moving gas (which is proportional to the gas velocity squared) in a relatively small diameter hose compared to its kinetic energy when moving at the same flow rate in a larger diameter hose.

Thus, a preferred compressible gas volume 57 in accumulator 50 and the diameter of pressure hoses 46, 63, 66 (especially pressure hose 66 between accumulator 50 and motor 68) are preferably experimentally determined in a sequential manner. A method of iteratively adjusting compressible gas volume 57 in pneumatic accumulator 50 comprises the steps of measuring transient relative motor torque for the motor 68; choosing a desired change in transient relative motor torque; adjusting said pneumatic accumulator compressible gas volume 57 to achieve the desired change in transient relative motor torque; comparing compensated and uncompensated motor speed rise times to obtain a rise time change; returning to the choosing step to establish a new desired change in transient relative motor torque if the rise time change is not acceptable; measuring motor run-on time; adjusting the motor run-on time (as described herein); and returning to the choosing step to establish a new desired change in transient relative motor torque if the motor run-on time is not acceptable.

Iterative Accumulator Volume Adjustments in a Preferred Embodiment

Figure 2:
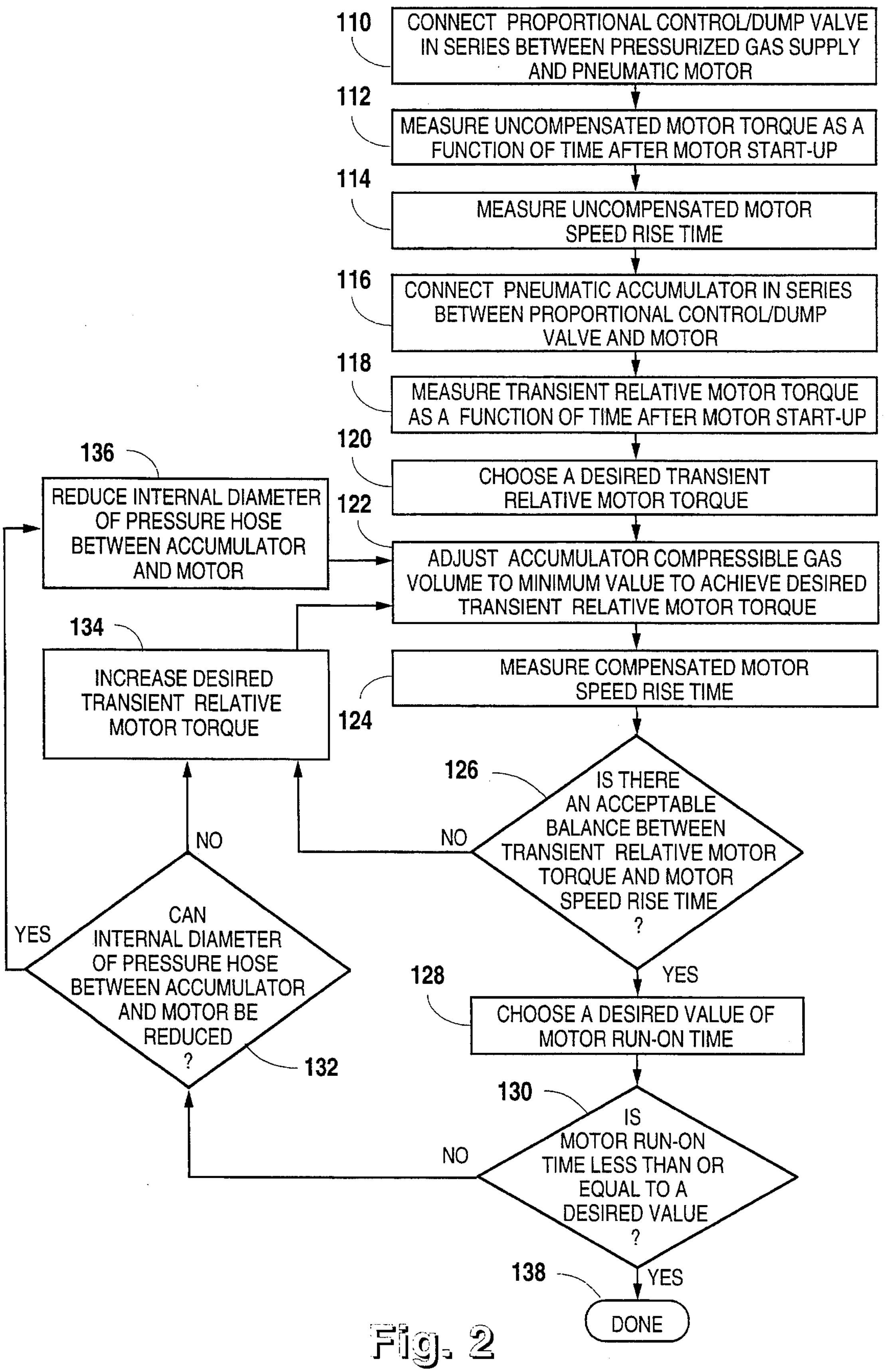
FIG. 2 schematically illustrates the steps of a method which includes iteratively adjusting the volume of a pneumatic accumulator.

The above method may be more completely understood by reference to FIG. 2, which schematically illustrates the steps for iterative adjustment of compressible gas volume 57 of accumulator 50. The first step 110 is to connect proportional control/dump valve 24 (but not accumulator 50) in series between pressurized gas supply 20 and pneumatic motor 68. This temporary connection by-passes accumulator 50 through pressure hose 65 (schematically shown dotted in FIG. 1). The function of pressure hose 65 in by-passing accumulator 50 may be achieved through valves (not shown) which close hoses 63,66 and open line 65, or alternatively by connecting hose 46 directly to motor 68. Proportional control/dump valve 24 is connected to pressurized gas supply 20 by pressure hose 22, and the valve action may be understood by considering movement of piston 36 under control of piston rod 26 in the direction of the arrow adjacent piston rod 26.

In the position shown in FIG. 1, piston 36, which fits slidingly and sealingly within valve body 38, is substantially closing pressurized gas inlet 40. In this position of piston 36, proportionally controlled gas outlet 44 is substantially cut off from pressurized gas supply 20. Simultaneously, pressure hose 46 communicates with proportionally controlled gas outlet 44 through interior space 25 and hose port 34. Muffler 28 (with muffler outlet 30 to ambient atmosphere) also communicates with interior space 25 through dump valve exhaust port 32. Thus, any pressure in hose 46 or proportionally controlled gas outlet 44 will tend to equilibrate with ambient atmospheric pressure.

If piston rod 26 and piston 36 move in the direction of the adjacent arrow (i.e., up), exhaust port 32 will be closed before gas inlet 40 opens. Further movement of piston rod 26 and piston 36 in the same direction will open gas inlet 40 an amount proportional to the amount of piston travel, thus allowing proportionally controlled pressurized gas from gas supply 20 to pass through inlet 40 and connector pipe 42 and out through proportionally controlled gas outlet 44 into interior space 25. Having entered interior space 25, proportionally controlled gas from outlet 44 may directly enter hose 46 through hose port 34.

Note that the design for proportional gas control/dump valve 24 which is illustrated in FIG. 1 is only one of several preferred embodiments for the valve wherein dump valve exhaust port 32, when open, communicates with proportionally controlled gas outlet 44 (which in turn communicates with hose 46 through interior space 25 and hose port 34) and which is coupled to proportional gas control valve 24, exhaust port 32 being substantially open when said proportional gas control valve pressurized gas inlet 40 is closed, and exhaust port 32 being substantially closed when said proportional gas control valve pressurized gas inlet 40 is at least partially open. These functional relationships may be obtained with a dump valve exhaust port 32 which is incorporated within proportional gas control/dump valve 24, as shown in FIG. 1, or when exhaust port 32 is incorporated within a substantially separate dump valve housing (not shown).

The second step 112 in FIG. 2 for iterative accumulator volume adjustments in a preferred embodiment is measurement of uncompensated motor torque (i.e., motor torque measured when there is no pneumatic accumulator 50 connected between gas supply 20 and motor 68) as a function of time after motor start-up. Results of such a measurement are shown by the empty square indicators in FIG. 4. Note that the motor torque transiently reaches a peak at about 0.14 seconds after motor start-up. It is primarily this transient peak in motor torque which is sought to be reduced by the present invention.

Figure 3:
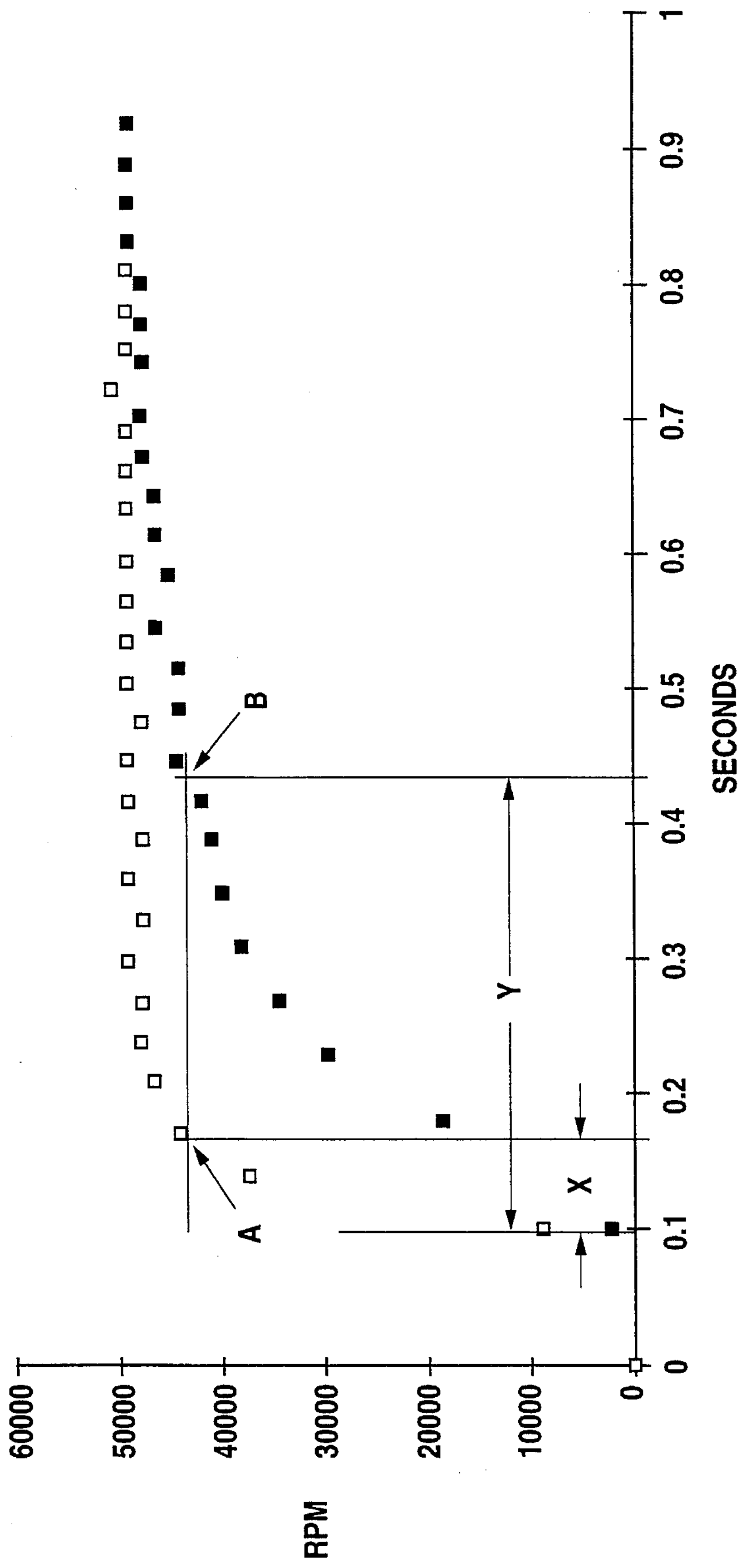
FIG. 3 schematically illustrates a typical motor speed curve indicating compensated and uncompensated rise times.

Step 114 in FIG. 2 requires measurement of uncompensated motor speed rise time, and results of such a measurement are shown by the empty square indicators in FIG. 3. Note that the uncompensated motor speed rise time is determined graphically in the present example as the time represented by the distance X along the time axis in FIG. 3 (i.e., about 0.65 seconds). The distance X is established by determining the time from the lowest measured speed (in revolutions per minute or RPM) to the point (point A in FIG. 3) where the measured speed is approximately ninety percent of its final steady-state value.

Step 116 in FIG. 2 requires connecting pneumatic accumulator 50 in series between proportional control/dump valve 24 and motor 68. This connection may be made as shown in FIG. 1, where pressure hose 65 (shown dotted) is removed (or shut off by valves not shown) and the pressurized gas path from valve 24 is through hoses 46 and 63 to accumulator 50, and thence through hose 66 through flow resistor 72 to motor 68. When connected, accumulator 50 may have an arbitrary compressible gas volume 57 because this volume is to be adjusted iteratively. Note that the accumulator 50 structure shown in FIG. 1 shows a piston 54 and piston rod 52 which fits sealingly and slidingly within accumulator body 64. Moving piston rod 52 (preferably manually) in the direction of the adjacent arrow (i.e., up) increases accumulator compressible gas volume 57, whereas the opposite movement of piston rod 52 decreases accumulator compressible gas volume 57. Also shown in FIG. 1 are optional baffles 60,62 which may act in conjunction with compressible gas volume 57 to decrease the amplitude of pressure transients in the gas stream entering accumulator 50 at accumulator gas inlet 58 and exiting accumulator 50 at accumulator gas outlet 56. Note that the function of piston 54 and piston rod 52 in changing accumulator compressible gas volume 57 could be achieved through use of a bellows or analogous device (not shown).

Figure 4:
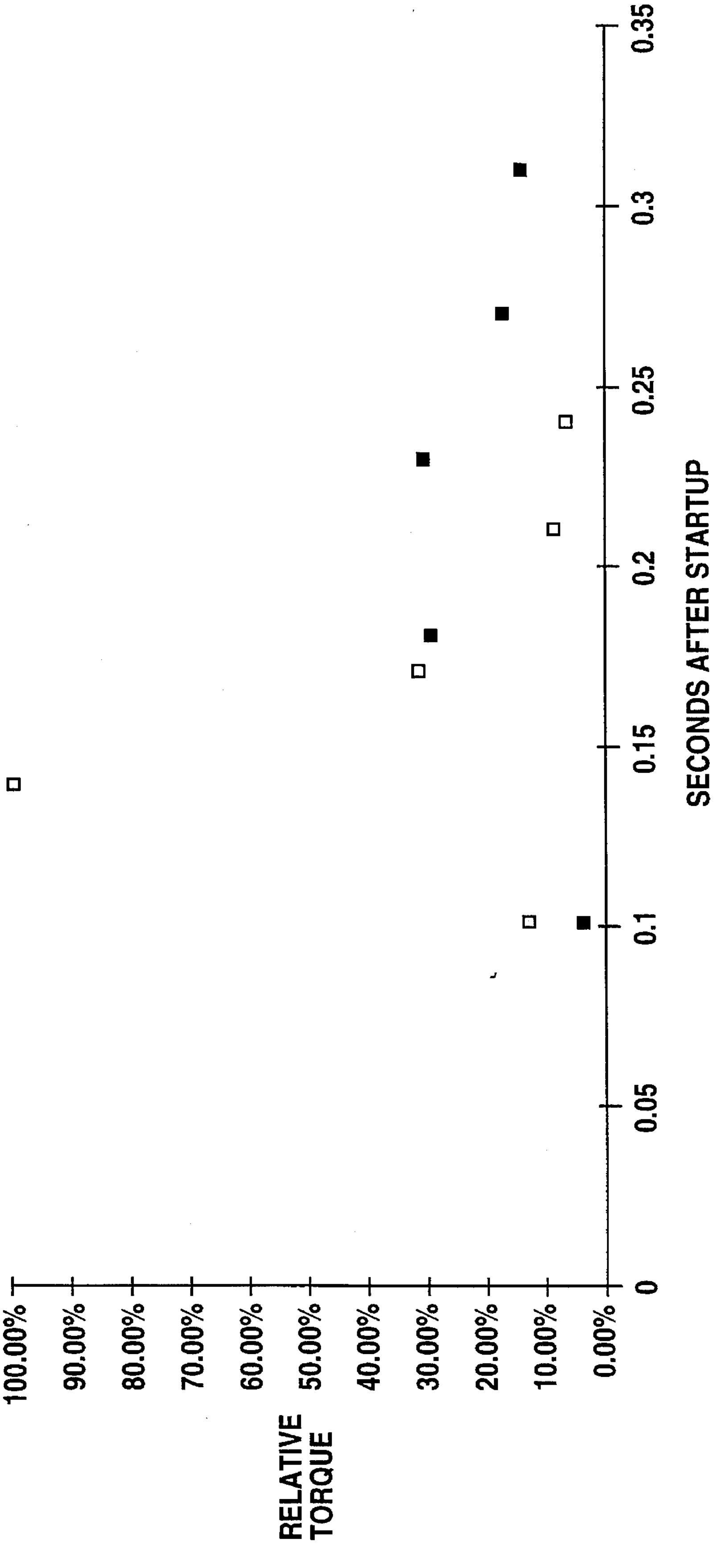
FIG. 4 schematically illustrates a typical pneumatic motor start-up torque transient and also shows the transient relative motor torque measured after insertion of a pneumatic accumulator between the gas supply and the motor.

Next, step 118 requires measurement of transient relative motor torque as a function of time after motor start-up. Results of this measurement are shown in the solid square indicators in FIG. 4. Note that the torque value represented by each solid square in FIG. 4 is actually a ratio (called the relative torque) of the measured (compensated) value of motor torque to the measured peak (transient) value of uncompensated motor torque determined in step 112.

A desired transient relative motor torque is chosen (step 120) and thereafter compressible gas volume 57 of accumulator 50 is adjusted (step 122) to a minimum value which will achieve the desired transient relative motor torque. Generally, this first chosen desired transient relative motor torque is the lowest value contemplated for the given application (i.e., it represents the strongest reduction of torque transients). Because the presence of compressible gas volume 57 tends to increase motor rise time, the compensated motor speed rise time (i.e., rise time with accumulator 50 connected between gas supply 20 and motor 68) is measured (step 124). A result of this measurement is illustrated on FIG. 3 (see the solid square indicator) as the distance Y. Note that the estimated point at which compensated motor speed reached approximately ninety percent of its steady-state value is identified as B in FIG. 3.

Then the question must be asked (in step 126) whether there is an acceptable balance between transient relative motor torque and motor speed rise time. If the balance is acceptable, a desired value of motor ran-on time is chosen (step 128). Motor run-on time is then measured (step 130) by measuring the time to stop motor shaft 70 from its steady-state speed by cut-off of gas supply 20 from motor 68 by movement of piston 36 in valve 24 to close pressurized gas inlet 40. The measured value of ran-on time is compared (step 130) to the desired value chosen in step 128 and if the measured value is less than or equal to the chosen value, adjustment of compressible gas volume 57 in accumulator 50 is complete.

In general, however, the answer to the questions in either of steps 126 or 130 may be NO. In that case, adjustment of compressible gas volume 57 of accumulator 50 must be reaccomplished after either increasing the desired transient relative motor torque (i.e., relaxing the requirement to maximally reduce motor torque transients) or using reduction of the pressure hose 66 diameter to reduce motor run-on time. In either case, the iterative adjustment process continues until an acceptable compromise is reached among the competing demands for strong filtering of gas pressure transients, maintenance of adequate rise time, and avoidance of excessive run-on time. Experimental results indicate that for a motor using about 8 cubic feet of air per minute, a compressible gas volume of approximately 18.5 cubic inches (including accumulator and pressure hose) provides satisfactory motor speed rise time and motor run-on time.

What is claimed is:

1. A method of iteratively adjusting the compressible gas volume in a pneumatic accumulator connected to a pneumatic motor, the method comprising providing proportionally controlled pressurized gas to the pneumatic accumulator;

measuring transient relative motor torque for the motor;

choosing a desired change in transient relative motor torque;

adjusting the pneumatic accumulator compressible gas volume to achieve said desired change in transient relative motor torque;

comparing compensated and uncompensated motor speed rise times to obtain a rise time change;

returning to said choosing step to establish a new desired change in transient relative motor torque if said rise time change is not acceptable;

measuring motor run-on time; and adjusting said motor run-on time and returning to said choosing step to establish a new desired change in transient relative motor torque if said motor run-on time is not acceptable.

2. A torque and speed control for insertion between a pressurized gas supply and a pneumatic motor, comprising a proportional gas control valve comprising a piston which fits sealingly and slidingly within a valve body and having a pressurized gas inlet for communication with the pressurized gas supply and a proportionally controlled gas outlet;

a pneumatic accumulator having a compressible gas volume, an accumulator gas inlet communicating with said proportionally controlled gas outlet, and an accumulator gas outlet for communicating with the pneumatic motor;

means for adjusting said accumulator compressible gas volume to obtain effective reduction of motor torque transients due to gas pressure transients, and a dump valve exhaust port within said valve body which, when not closed by said gas control valve piston, communicates with said proportionally controlled gas outlet and which is coupled to said proportional gas control valve through said gas control valve piston, said exhaust port being substantially open when said proportional gas control valve pressurized gas inlet is closed by said gas control valve piston, and said exhaust port being substantially closed when said proportional gas control valve pressurized gas inlet is at least partially open.

3. The torque and speed control of claim 2 wherein said pneumatic accumulator comprises a piston which fits sealingly and slidingly within an accumulator body, said pneumatic accumulator compressible gas volume being adjustable by movement of said accumulator piston.

4. The torque and speed control of claim 3 wherein said pneumatic accumulator further comprises at least one internal baffle.

* * * * *